United States Patent [19]

Job

[11] Patent Number: 5,270,410
[45] Date of Patent: Dec. 14, 1993

[54] PROCESS FOR THE PRODUCTION OF ELASTOMERIC, PRIMARILY SYNDIOTACTIC POLYPROPYLENE AND CATALYSTS FOR USE IN SAID PROCESS

[75] Inventor: Robert C. Job, Houston, Tex.

[73] Assignee: Shell Oil Company, Houston, Tex.

[21] Appl. No.: 597,240

[22] Filed: Oct. 15, 1990

Related U.S. Application Data

[62] Division of Ser. No. 342,832, Apr. 25, 1989.

[51] Int. Cl.$^5$ .............. C08F 4/654; C08F 10/06
[52] U.S. Cl. .................. 526/124; 526/351; 526/125
[58] Field of Search .................. 526/125, 141, 124

[56] References Cited

U.S. PATENT DOCUMENTS

| | | | |
|---|---|---|---|
| 3,112,300 | 6/1955 | Natta et al. | 260/93.7 |
| 3,112,301 | 6/1955 | Natta et al. | 260/93.7 |
| 3,175,999 | 8/1956 | Natta et al. | 260/93.7 |
| 3,240,773 | 3/1956 | Boor, Jr. | 260/93.7 |
| 3,257,370 | 1/1962 | Natta et al. | 260/93.7 |
| 3,258,455 | 6/1960 | Natta et al. | 260/93.7 |
| 3,305,538 | 2/1967 | Natta et al. | 260/93.7 |
| 3,335,121 | 7/1967 | Natta et al. | 260/93.7 |
| 3,534,006 | 3/1967 | Kamaishi et al. | 260/80.78 |
| 3,932,307 | 1/1976 | Setterquist | 252/430 |
| 3,950,269 | 4/1976 | Setterquist | 252/430 |
| 3,971,767 | 7/1976 | Setterquist | 526/65 |
| 4,011,383 | 3/1977 | Setterquist | 526/154 |
| 4,017,525 | 4/1977 | Setterquist | 260/429.3 |
| 4,072,809 | 2/1978 | Rogan | 526/136 |
| 4,136,243 | 1/1979 | Appleyard et al. | 526/139 |
| 4,226,963 | 10/1980 | Giannini et al. | 526/114 |
| 4,255,281 | 3/1981 | Rogan et al. | 252/429 B |
| 4,310,439 | 1/1982 | Langer | 252/429 B |
| 4,317,898 | 3/1982 | Karayannis et al. | 526/141 |
| 4,325,836 | 4/1982 | Epstein et al. | 252/429 B |
| 4,329,253 | 5/1982 | Goodall et al. | 252/429 B |
| 4,335,225 | 3/1982 | Collette et al. | 525/240 |
| 4,336,360 | 6/1982 | Giannini et al. | 526/114 |
| 4,347,160 | 8/1982 | Epstein et al. | 252/429 B |
| 4,393,182 | 7/1982 | Goodall et al. | 526/125 |
| 4,394,291 | 7/1983 | Hawley | 252/429 B |
| 4,400,302 | 8/1983 | Goodall et al. | 526/125 |
| 4,442,276 | 4/1984 | Kashiwa et al. | 526/125 |
| 4,487,845 | 12/1984 | Triplett | 502/107 |
| 4,581,342 | 4/1986 | Johnson et al. | 502/119 |
| 4,710,482 | 6/1986 | Job | 502/127 |
| 4,754,006 | 6/1988 | Murata et al. | 526/124 |

FOREIGN PATENT DOCUMENTS

| | | |
|---|---|---|
| 1146699 | 5/1983 | Canada . |
| 0206753 | 6/1986 | European Pat. Off. . |
| 1486194 | 12/1973 | United Kingdom . |
| 1554340 | 6/1977 | United Kingdom . |

OTHER PUBLICATIONS

Thermoplastic Elastomers, C. K. Shih, A. C. L. Su, Hanser Publishers, Munich vienna New York.
Polymer Sequence Determination, James C. Randall.
Macromol. Rev. 2, Syndiotactic Polypropylene, E. A. Youngman and J. Boor, Jr.
Makromol. Chem., Stereochemical Structure and Molecular Weight Distribution of Polypropylenes, Yoshiharu et al.

Primary Examiner—Edward J. Smith
Attorney, Agent, or Firm—Donald F. Haas

[57] ABSTRACT

A process and a catalyst for the production of elastomeric primarily syndiotactic polypropylene characterized by short average block lengths wherein propylene is polymerized in the presence of the catalyst which comprises the reaction product of a magnesium alkoxide and a tetravalent titanium halide which takes place in the presence of an electron donor, an organoaluminum compound, and a selectivity control agent which is an effectively hindered heterocyclic aromatic nitrogen compound wherein the hindrance is not provided by a Cl$^-$or methoxy group.

5 Claims, 1 Drawing Sheet

PROCESS FOR THE PRODUCTION OF ELASTOMERIC, PRIMARILY SYNDIOTACTIC POLYPROPYLENE AND CATALYSTS FOR USE IN SAID PROCESS

This is a division of application Ser. No. 342,832 filed Apr. 25, 1989.

BACKGROUND OF THE INVENTION

This invention relates to a process for the production of elastomeric, primarily syndiotactic polymers and to a catalyst which can be used in such process.

Syndiotactic polypropylene is prepared traditionally near dry ice temperature as described by G. Natta et al., U.S. Pat. No. 3,335,121, Aug. 6, 1967 to Montecatini Edison, in extremely low yield (giving product containing only 40 to 80% low molecular weight short block length, syndiotactic polymer) using soluble vanadium chloride or ketonate complexes in conjunction with dialkyl aluminum halides. As measured by triads in the $^{13}$C NMR, a polymerization which produces 76% syndiotactic and 0% isotactic polymer at $-78°$ C. will produce polymer which is only 15% syndiotactic and 59% isotactic when carried out at 41° C., Y. Doi. M. Takada and T. Keii, *Makromol. Chem.* 180, 57–64 (1979). The most active catalyst claimed to date uses vanadium tris(2-methyl-3-oxobutanalate) with 400 equivalents of diethylaluminum chloride at $-70°$ C. to produce 79% syndiotactic polymer at a rate of 5.2 g/mmol vanadilum/hour (0.08 g PP/g total catalyst) S. Suzuki, EP 0206753 A1, Dec. 30, 1986 to Toa Nenryo. In order to allow for a rapid characterization of syndiotactic polypropylene, an IR syndiotactic crystallinity index has been arbitrarily defined as the ratio 2A $_{11.53}$/[A $_{2.32}$+A$_{2.35}$]. According to the above-mentioned Natta patent, syndiotactic polypropylenes produced using heterogeneous catalysts exhibit IR indices of less than 0.8 Youngman and Boor reported a 66% crystalline syndiotactic polymer to exhibit an index of 2.4, E. Youngman and J. Boor, *Macromol. Rev.* 2, 33–69 (1967).

Another patent to J. Collette and C. Tullock, U.S. Pat. No. 4,335,225, Jun. 15, 1982 to du Pont, claims significant yields of short stereoblock isotactic polymer to result from using homogeneous zirconium or hafnium catalysts supported upon partially hydrated alumina. The patent actually appears to be similar, using a different catalyst, to Natta's earlier stereoblock patent, U.S. Pat. No. 3,175,999, Mar. 30, 1965 to Montecatini. Thus an aged slurry of one gram of alumina plus 0.36 mmol of tetraneophylzirconium in 40 ml of cyclohexane and 2 ml of toluene was used together with 70 mmol of hydrogen to polymerize 126 grams of propylene dissolved in 450 ml cyclohexane at a temperature of about 51° C. for an hour. The viscous product was washed thoroughly with acetone to give a crumb-like solid in yield of 284 g PP/mmol Zr/hour (84 g PP/g total catalyst). It was reported that some syndiotactic polymer was also present.

The specific catalyst TI(OR)$_4$/3TiCl$_3$*AlCl$_3$/R$_2$AlX has been reported to be effective for the production of high molecular weight rubbery materials from propylene by A. Schrage and E. Pless in U.S. Pat. No. 3,329,741, Jul. 4, 1967 to Rexall Drug. Productivities as high as 9.0 g PP/mmol Ti/hr (1.8 g PP/g total catalyst) are reported. Highly dispersed "quasihomogeneous" PR$_3$/3TiCl$_3$*AlCl$_3$/AlR'$_3$, is reported to be utilized in aromatic solvent below 30° C., for the production of low quality syndiotactic polypropylene by D. Emrick in U.S. Pat. No. 3,364,190, Jan. 16, 1968 to Standard Oil. Productivities on the order of 11.3 g PP/mmol Ti/hr (8.8 g PP/g total catalyst) are reported. The 20% of the polymer thus produced, which was soluble in hot isooctane, exhibited an IR syndiotactic crystallinity index of only 0.5 while the polymer which isn't soluble in hot isooctane exhibited an IR syndiotactic index of nearly zero, i.e. it is isotactic. Similar results are reported for VCl$_3$.

U.S. Pat. No. 4,335,225, mentioned above, discloses a fractionable elastic polypropylene which is said to have an isotactic content of 55% or less and also to contain some syndiotactic and atactic polypropylene. This patent, and its companions on the catalyst system for making this elastic polypropylene, contain much information about elastic-type polypropylene compositions, although the researchers at Montecatini, especially including Giulio Natta, produced some polypropylene compositions which exhibited some of the characteristics of elastomeric compositions. Specifically, U.S. Pat. Nos. 3,175,999; 3,257,370 and 3,258,455 disclose polypropylene compositions which have some elastic-type properties.

Elastomeric polypropylene is different from the "normal" or more well known polypropylenes. These more well known types are crystalline and amorphous polypropylenes. It is normally accepted that crystalline polypropylene generally has the isotactic or syndiotactic structure and that amorphous polypropylene generally has considerable atactic structure. Giulio Natta's U.S. Pat. Nos. 3,112,300 and 3,112,301 describe isotactic polypropylene and give structural formulae for isotactic and syndiotactic polypropylene. The former is a straight chain of propylene units wherein the methyl groups are all aligned on one side of the polymer chain. In the latter, the methyl groups alternate from one side of the chain to the other. In atactic polypropylene, the methyl groups are arranged randomly on the two sides of the chain.

Almost all of the polypropylene which is used commercially is crystalline isotactic polypropylene. These products are well known and have been the subject of many patents and articles. Amorphous polypropylenes, which have very little strength, are used commercially primarily in adhesives and asphalt additives.

SUMMARY OF THE INVENTION

The present invention relates to a catalyst which is useful in the production of elastomeric, primarily syndiotactic polymers of propylene and which operates at much higher temperatures and of significantly higher production rates 1,000 times) than catalysts of the prior art. The catalyst component comprises the reaction product of a magnesium alkoxide compound, which may be of the formula MgR$_1$R$_2$, where R$_1$ is an alkoxide or aryl oxide group and R$_2$ is an alkoxide or aryl oxide group or halogen, and a tetravalent titanium halide wherein the reaction takes place in the presence of an electron donor. The catalyst is completed by an organoaluminum compound and a selectivity control agent which is an effectively hindered heterocyclic aromatic nitrogen compound wherein the hindrance is not provided by a Cl$^-$or methoxy group.

DETAILED DESCRIPTION OF THE INVENTION

Figure 1:
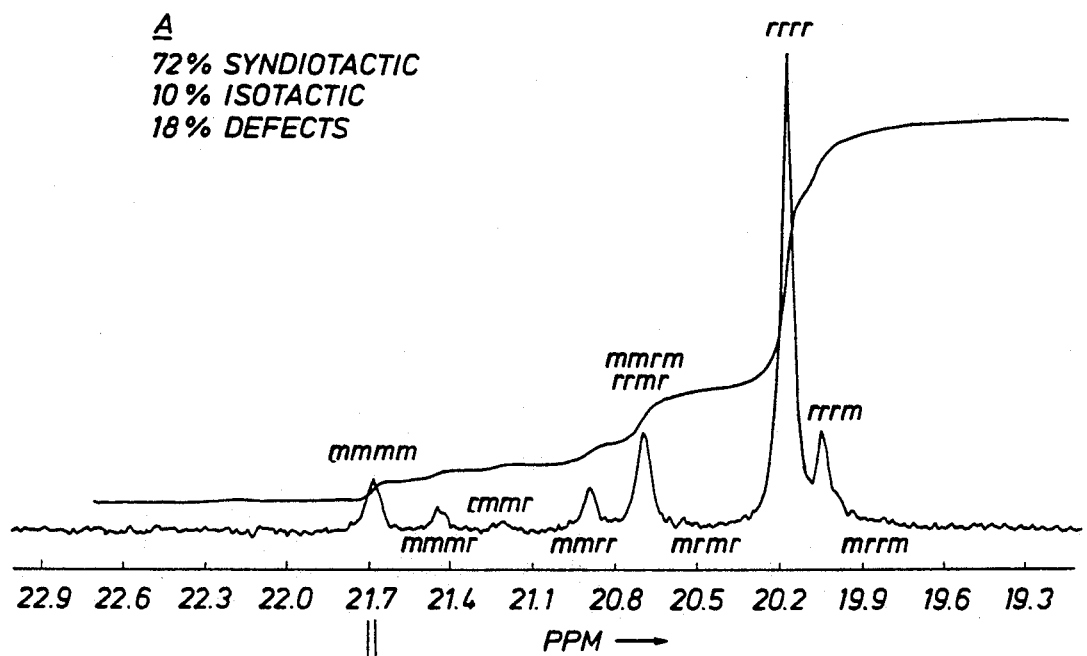
FIGS. 1 and 2 illustrate the difference in the NMR spectra of syndiotactic (FIG. 1) and isotactic (FIG. 2) polypropylene.
Figure 2:
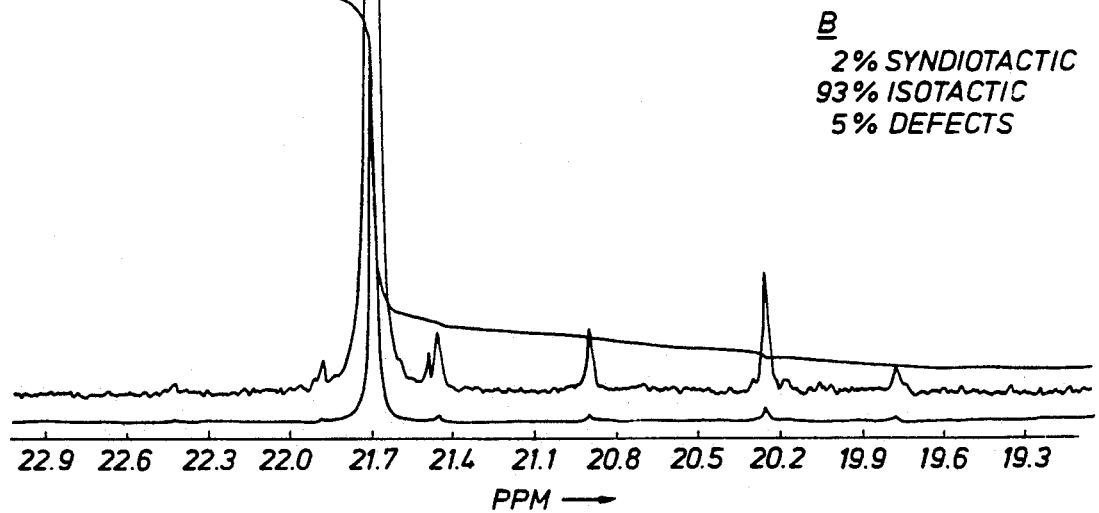

The "normal" well known polypropylenes discussed above are generally high molecular weight materials which consist of blocks of monomer units of relatively or extremely long average isotactic block length ($<Liso>$), for example, 50 to 200 monomer units. The prior art isotactic polymers (prepared via a $MgCl_2$ supported catalyst) of short average isotactic block length (about 6 to 15 monomer units) normally contain a wide distribution of polymer blocks of varying lengths and are characterized by having relatively low tensile strength and being tacky to the touch.

The polypropylene compositions of the present invention are specifically characterized in that they have a narrow distribution of relatively short block lengths and may be characterized as being of relatively high tensile strength and non-tacky to the touch. By "block lengths" it is meant the number of recurring monomer units, in this case propylene, which, on the average, occur before there is a defect in the polymer chain. By "defect" it is meant that the symmetry of the recurring units is ended and there may begin a different structure (i.e. a change from syndiotactic to isotactic) or units of another monomer may be placed therein. It is theorized that the average block length, as determined by a numerical integration of the penteds which occur in the $^{13}C$ NMR spectrum (see FIG. 1), has a great effect on the properties of the polymer. For instance, relatively short average block lengths, i.e. 6 to 15, tend to occur in a flexible and rubbery polymer which exhibits good elastic properties and is relatively strong (with tensile strengths of about 1000 to 3000 psi). On the other hand, isotactic block lengths of greater than about 50 are characteristic of commercial, very stiff, highly crystalline isotactic polypropylene.

U.S. Pat. No. 4,335,225, discussed above, discloses how to make an elastomeric polypropylene composition which contains up to 55%, and preferably much less, isotactic polypropylene. This polypropylene has an inherent viscosity of 1.5 to 8, a major melting point between 135° and 155° C., exhibits no yield point, has a tensile set not exceeding 150% and contains 10 to 80% by weight of a diethyl ether-soluble fraction which has an inherent viscosity exceeding 1.5 wherein said fraction has an isotactic crystalline content of about 0.5% to about 5% by weight. A special catalyst, which is the subject of several other related patents, is said to be required to make this material. These catalysts are homogeneous zirconium or hafnium catalysts supported upon partially hydrated alumina. Such catalyst systems are difficult to work with, have extremely low productivities (on the order of 1-2% of the productivities of the catalysts of this invention) and are not used commercially to any appreciable extent.

The polypropylenes of the present invention are made with a well known type of procatalyst for which there is a wealth of commercial experience and knowledge. The procatalyst is comprised of the reaction product of a magnesium alkoxide compound, which may be of the formula $MgR_1R_2$, where $R_1$ is an alkoxy or aryl oxide group and $R_2$ is an alkoxide or an aryl oxide group or halogen, and a tetravalent titanium halide wherein the reaction takes place in the presence of an electron donor and, preferably, a tialogenated hydrocarbon. Such procatalysts are well known and have been used for several years commercially. The catalyst is completed by the addition of organoaluminum compound and a selectivity control agent which is a hindered heterocyclic aromatic nitrogen compound.

Exampler of halogen containing magnesium compounds that can be used as starting materials for the halogenating reaction are alkoxy and aryloxy magnesium halides, such as isbutoxy magnesium chloride, ethoxy magnesium bromide, phenoxy magnesium iodide, cumyloxy magnesium bromide, naphthenoxy magnesium chloride and $Mg_4(OMe)_6(MEOH)_{10}Cl_2$.

Preferred magnesium compounds to be halogenated are selected from magnesium dialkoxides and magnesium diaryloxides. In such compounds the alkoxide groups suitable have from 1 to 8 carbon atoms, and preferably from 2 to 8 carbon atoms. Examples of these preferred groups of compounds are magnesium di-isopropoxide, magnesium diethoxide, magnesium dibutoxide, magnesium diphenoxide, magnesium dinaphthenoxide and ethoxy magnesium isobutoxide. Magnesium alkoxides disclosed in U.S. Pat. No. 4,710,482, issued Dec. 1, 1987 to Robert C. Job, are also preferred for use herein. Especially preferred is $Mg_4(OCH_3)_6(CH_3OH)_{10}X_2$ where X is resorcinol or a substituted resorcinol monoanion.

Magnesium compounds comprising one alkyl group and one alkoxide or aryloxide group can be employed, as well as compounds comprising one aryl group and one alkoxide or aryloxide group. Examples of such compounds are phenyl magnesium phenoxide, ethyl magnesium butoxide, ethyl magnesium phenoxide and naphthyl magnesium isoamyloxide.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e. yielding magnesium halides in which the atomic ratio of halogen to magnesium is at least 1.5. Except in cases where resorcinols are used) the most preferred reactions are those leading to fully halogenated reaction products. Such halogenation reactions are suitably effected by employing a molar ratio of magnesium compound to titanium compound of 0.005:1 to 2:1, preferably 0.01:1 to 1:1. These halogenation reactions are conducted in the additional presence of an electron donor. An inert hydrocarbon or halohydrocarbon diluent or solvent may be used as a partial substitute for the titanium compound.

Suitable electron donors are ethers, esters, ketones, phenols, amines, amides, imines, nitriles, phosphines, silanes, phosphites, stibines, arsines, phosphoramides and alcoholates. Examples of suitable donors are those referred to in U.S. Pat. No. 4,442,276. Preferred donors are esters. Preferred esters are esters of aliphatic and aromatic dicarboxylic acids, such as dimethyl carbonate, dimethyl adipate, dihexyl fumarate) dibutyl maleate, ethylisopropyl oxalate, diethyl phthalate and diisobutyl phthalate. Preferred electron donors for use in preparing the titanium constituent are the dialkylphthalates.

Suitable halides of tetravalent titanium include aryloxy- or alkoxy-di and -trihalides, such as dihexanoxy-titanium dichloride, diethoxy-titanium dibromide, isopropoxy-titanium triiodide and phenoxy-titanium trichloride. Titanium tetrahalides are preferred. Most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,1-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,1-trichloroethane are preferred aliphatic halohydrocarbons. Aromatic halohydrocarbons may also be employed, e.g., chlorobenzene, bromobenzene, dichlorobenzene, dichlorodibromobenzene, naphthyl chloride, chlorotoluene, dichlorotoluenes, and the like- chlorobenzene and dichlorobenzene are preferred aromatic halohydrocarbons. Chlorobenzene is the most preferred halohydrocarbon.

The halogenation normal proceeds under formation of a solid reaction product which may be isolated from the liquid reaction medium by filtration, decantation or another suitable method. It may be subsequently washed with an inert hydrocarbon diluent, such as n-hexane, isooctane or toluene, to remove any unreacted material, including physically adsorbed halohydrocarbon.

The product is also contacted with a tetravalent titanium compound such as a dialkoxy-titanium dihalide, alkoxy-titanium trihalide, phenoxy-titanium trihalide or titanium tetrahalide. The most preferred titanium compounds are titanium tetrahalides and especially titanium tetrachloride. This treatment increases the chloride content of the tanium tetrachloride in the solid catalyst component. This increase should preferably be sufficient to achieve a final atomic ratio of tetravalent titanium to magnesium in the solid catalyst component of from 0.005 to 3.0, particularly of from 0.02 to 1.0. To this purpose the contacting with the tetravalent titanium compound is most suitably carried out at a temperature of from 60° to 136° C. during 0.1-6 hours, optionally in the presence of an inert hydrocarbon diluent. Particularly preferred contacting temperatures are from 70° to 120° C. and the most preferred contacting periods are in between 0.5 to 3.5 hours. The treatment may be carried out in successive contacts of the solid with separate portions of TiCl$_4$.

After the treatment with tetravalent titanium compound the catalyst component is tably isolated from the liquid reaction medium and washed to removed unreacted titanium compound. The titanium content of the final, washed catalyst constituent is suitably between about 1.5 to 3.6 percent by weight or up to about 4.5 percent. The preferred halogen atom, possibly contained in the magnesium compound to be halogenated, and contained in the titanium compound which serves as halogenating agent and in the tetravalent titanium compound with which the halogenated product is contacted, is chlorine.

The material used to wash the catalyst component is an inert, light hydrocarbon liquid. Preferred light hydrocarbon liquids are aliphatic, alicyclic and aromatic hydrocarbons. Examples of such liquids include isopentane, n-hexane, iso-octane and toluene, with iso-pentane being most preferred. The amount of light hydrocarbon liquid employed is 5 to 100 cc/gm of procatalyst in each of 2 to 6 separate washes, preferably about 25 cc/gm. The resulting solid component is the procatalyst, which is used with cocatalyst and selectivity control agent in the polymerization process.

The primary organoaluminum compound to be employed as cocatalyst may be chosen from any of the known activators in olefin polymerization catalyst systems comprising a titanium halide but is most suitably free of halogens. Vile aluminum trialkyl compounds, dialkylaluminum halides and dialkylaluminum alkoxides may be used, aluminumtrialkyl compounds are preferred, particularly those wherein each of the alkyl groups has 1 to 6 carbon atoms, e.g., aluminumtrimethyl, alwninumtriethyl, aluminumtri-n-propyl, aluminumtri-isobutyl, aluminumtri-isopropyl and aluminumdibutyl-n-amyl. Alternatively, these may be used in combination with various alkyl aluminum halides, e.g. diethyl aluminum chloride. Preferred proportions of selectivity control agent, employed separately, in combination with, or reacted with an organoaluminum compound, calculated as mol per mol titanium compound, are in the range from 1 to 100 particularly from 10 to 80.

The selectivity control agents which are necessary to achieve the advantages of the present invention are effectively hindered heterocyclic aromatic nitrogen compounds. By "effectively" hindered it is meant that these compounds must be sterically or electronically hindered to a sufficient extent so that they will produce elastomeric, primarily syndiotactic polypropylene but it is important to note that the selectivity control agents must not be hindered to too great an extent or otherwise such syndiotactic polypropylene will not be produced.

Generally, sufficient or "effective" hindrance is provided by a constituent group or groups which are attached to the carbon atoms located on either side of the nitrogen compound in the aromatic ring. Methyl groups, as in 2,6-lutidine, are of sufficient size to provide effective hindrance but are not too big so that the advantages of the present invention are not achieved. For instance, I have found that, generally, neither hydrogen atoms, as in pyridine, nor benzo groups, as in acridine, are bulky enough to allow the production of such syndiotactic polymers (although benzo groups in combination with methyl groups, as in quinaldine, give superior performance) and that tertiary butyl groups, as in 2,6-ditertbutylpyridine, are too bulky to allow the production of such syndiotactic polymers. If the substituent group is insufficiently bulky, the SCA acts as a severe poison and leads to the production of predominantly isotactic polymer. If the substituent group is too bulky, the electron donor will not undergo efficient binding to the catalytic system and thus will not provide any stereochemical control. However if the hindrance is provided by a Cl$^-$or a methoxy group, different polymers are produced.

To prepare the final polymerization catalyst composition, procatalyst, cocatalyst and selectivity control agent may be simply combined, most suitably employing a molar ratio to produce in the final catalyst an atomic ratio of aluminum to titanium of from 1 to 150, and suitably from about 10 to about 150. Increasing the Al:Ti ratio tends to slightly increase catalyst activity at the expense of increased catalyst residue in the unextracted product. These factors will be considered in selecting the Al:Ti ratio for any given process and desired product. In general, Al:Ti ratios in the range of 30:1 to 100:1 and especially of about 50:1 to 80:1 will be found advantageous.

Polymerization of propylene may be conducted with the catalysts of the invention in a liquid system with an inert diluent such as a paraffinic liquid of 3 to 15 carbon atoms per molecule, or in a liquid system containing propylene as sole diluent or together with a small amount of propane, or in vapor phase. Propylene polymerization in liquid phase is conducted at a temperature of 50° to 80° C. and at a pressure sufficient to maintain liquid conditions. In a continuous reaction system, the liquid in the reaction zone is maintained at reaction conditions, monomer is continuously charged to the reaction zone, catalyst components are also charged continuously or at frequent intervals to the reaction zone, and reaction mixture containing polymer is withdrawn from the reaction zone continuously or at frequent intervals.

In propylene polymerization, the reaction mixture is typically maintained at conditions at which the polymer is produced as a slurry in the reaction mixture. The catalyst systems of this invention are extremely active and highly specific in propylene polymerization, so that no removal of catalyst components or of atactic polymer from the polymer product is required.

While the catalysts of this invention are particularly adapted for use in continuous polymerization systems, they may, of course, also be employed in batch polymerization. This may be of advantage in multi-stage polymerization in which propylene polymers and propylene-ethylene polymers are produced in separate reaction zones arranged in sequence.

It is well known that supported coordination procatalysts and catalyst systems of the type used herein are highly sensitive, in varying degrees, to catalyst poisons such as moisture, oxygen, carbon oxides, polyolefins, acetylenic compounds and sulfur compounds. It will be understood that in the practice of this invention, as well as in the following examples, both the equipment and the reagents and diluents are carefully dried and free of potential catalyst poisons.

The productivity of the procatalyst is determined as kg polymer/g procatalyst in a standard or-e hour batch reaction- it may also be expressed as kg polymer/g -Li. Catalyst activity is sometimes reported as kg polymer/g procatalyst or Ti/hr. If determined in a standard one hour test, activity thus is numerically the same as productivity.

The specificity towards production of syndiotactic polymer and towards average block length is determined by measurements involving the penteds observed in the $^{13}$C NMR spectrum (See "Polymer Sequence Determination, Carbon-$^{13}$NMR Method" by James C. Rand, Academic Press, NY 1977). A relationship has been determined such that the average block length may be estimated by measuring the amount of xylene soluble polymer (XS) in accordance with regulations of the U.S. Food and Drug Administration. The XS test is carried out as follows: The sample is completely dissolved in xylene in a stirred flask by heating at 120° C. The flask is then immersed in a water bath at 25° C. without stirring for one hour, during which the insoluble portion precipitates. The precipitate is filtered off and the solubles present in the filtrate are determined by evaporating a 20 ml aliquot of the filtrate, during the residue under vacuum, and weighing the residue. The xylene-solubles increase for short block length material and may include some amorphous and low molecular weight crystalline material. (FDA regulations 121.2501 and 121.2510, 1971). The desirable numerical value of XS for the propylene homopolymers of this invention is typically between about 35% and about 85%.

Preparation of Procatalysts used in this Invention

Precatalyst A:

Magnesium methoxide solution (12%) was prepared by dissolving magnesium metal in methanol containing 0.125 equivalent of tetraethoxy silane (TEOS) and then filtering through a medium porosity fritted glass filter to remove the slight amount of grey suspension.

The magnesium methoxide solution (791 g, 1.10 mol) was added slowly, at 60° C., to a solution of resorcinol (60.5 g, 0.55 mol) in methanol (175 g) while stirring at 450 rpm with a 3 inch wide, curved teflon paddle of 1.5 in 2 surface area. By the time ⅓ of the methoxide had been added the flocculant precipitate had gotten quite viscous so another 155 g of methanol was added. After addition was complete the reaction was stirred for an hour then filtered. The solids were washed with methanol then isooctane then dried under moving nitrogen to yield crystalline cylindrical rods of formula: $Mg_4(OCH_3)_6(CH_3)_{10}(resorcinolate)_2$. Partial desolvation of this precursor was carried out by boiling 40 g of solids in 300 g of cyclohexane, containing 120 g of tetraethoxysilane, until the volume had decreased by 20–30%.

The procatalyst was prepared by stirring 7.8 g of the partially desolvated precursor in 200 ml of a 50/50 (vol/vol) mixture of $TiCl_4$/chlorobenzene. After adding isobutylphthalate (2.5 ml, 8.7 mmol) the mixture was heated in an oil bath and stirred at 115° C. for 60 minutes. The mixture was filtered hot and the solids slurried in 200 ml of fresh $TiCl_4$/chlorobenzene mixture. Phthaloyl chloride (0.5 ml) 3.4 mmol) and p-toluoyl chloride (0.5 ml, 3.7 mmol) were added and the mixture stirred at 115° C. After 60 minutes the mixture was filtered hot and the solids slurried again into 200 ml of fresh $TiCl_4$/chlorobenzene mixture, heated at 115° C. for 30 min and filtered hot. The solids were then slurried into 100ml of fresh TiCl /chlorobenzene mixture, heated at 115° C. for 10 minutes and filtered hot. The solids were allowed to cool then washed with six 150 ml portions of isopentane and dried for 100 minutes under moving nitrogen at 40° C. Ti=2.54%.

Procatalyst B:

Magnesium ethoxide (8.2 g, 72 mmol) was slurried in 200 ml of 50/50 (vol/vol) $TiCl_4$/chlorobenzene and then isobutyl phthalate (2.5 ml, 8.5 mmol) was added at room temperature. The gently stirring mixture was heated to 110° C. and held for 1 hour. The mixture was filtered hot and then another 200 ml of the $TiCl_4$/chlorobenzene mixture was added along with phthaloyl chloride (0.42 ml, 2.9 mmol) and ethyl benzoate (0.37 ml, 2.6 mmol) and the gently stirring slurry was held at 110° C. for another 1.0 hr. and filtered hot. The solids were slurried in one final 200 ml portion of the $TiCl_4$/chlorobenzene solvent mix and stirred gently for 0.5 hour at 110° C. The mixture was filtered hot and then allowed to cool to 40° C. before washing with six 150 ml aliquots of isopentane. The resulting powder was dried for 100 minutes under moving nitrogen at 40° C. The yield is 9 gm of procatalyst. Ti=2.70%.

Procatalyst C:

Magnesium (104 g, 4.28 mol) was added portionwise to a mixture of 1.2 liters of methanol and 130 ml TEOS in a 3-liter-3-neck flask. Overnight stirring yielded a crystalline slush from which no solvent could be decanted. 1500 ml of TEOS was added as the slush was gently broken up with a spatula to produce a thick milky slurry which turned cold while stirring and turned white and thickened over an hour of stirring. The extremely thick slurry was diluted in two steps: 66% was diluted with 700 ml TEOS and 33% of that was diluted to 21 with TEOS to provide a milky slurry containing the equivalent of 22 g magnesium.

This slurry was heated gradually to a pot temperature of 153° C. as distillate was collected over a 2 hour period. Microscopic examination revelated glassy granular particles in a narrow size distribution around 15 micron.

The granular particles (8.2 g, 56 mmol) were slurried in 200 ml of a 50/50 (vol/vol) mixture of $TiCl_4$/chlorobenzene. After adding isobutylphthalate (2.5 ml, 8.7 mmol) the mixture was heated in an oil bath and stirred at 110° C. for 60 minutes. The mixture was filtered hot and the solids slurried in 200 ml of fresh $TiCl_4$/chlorobenzene mixture. Phthaloyl chloride (0.42 ml, 2.9 mmol) and ethyl benzoate (0.37 ml, 2.6 mmol) were added and the mixture stirred at 110° C. After 60 minutes the mixture was filtered hot and the solids slurried again into 200 ml of fresh $TiCl_4$/chlorobenzene mixture. The slurry was stirred for 30 minutes at 110° C. then filtered hot. The solids were allowed to cool to 40° C. and then washed with six 150 ml portions of isopentane and dried for 100 minutes under moving nitrogen at 40° C. Yield 8.0 g of pink procatalyst. Analysis: 2.55% Ti.

Procatalyst D:

Prepared from 330 lb of $Mg(OEt)_2$ using the same procedure and molar ratios as described for procatalyst B. Ti=2.77%.

Procatalysts were used as a 5% slurry in mineral oil. Triethylaluminum (TEA) was used as a 0.28 M solution in isooctane, diethylaluminumchloride (DEAC) was used as a 1.54 M solution in heptane and tetramethylpyrazine was used as a 12% solution in isooctane. Examples 1–4 illustrate the effect of using tetramethylpyrazine as selectivity control agent (SCA) with four procatalysts (A-D above). Example 5 is a comparative example in which the tetramethylpyrazine had been omitted.

Triethylaluminum (1.2 mmol) and tetramethylpyrazine (0.24 mmol) were mixed together and then an amount of procatalyst slurry containing 0.012 mmol Ti was mixed with that. After 20 min., 0.60 ml of DEAC was added to produce the total catalyst mixture. TEA (1.4 mmol) was then injected to 2.7 liters of propylene in a rapidly stirring 1 gallon stainless steel autoclave at 65° C. followed by the total catalyst mixture and polymerization was carried out for about 200 minutes at 65° C. After evaporation of excess propylene and cooling to room temperature the polymers were removed as a lump from the reactor then cut into pieces and allowed to dry overnight in a fume hood prior to characterization.

The productivities, the xylene solubles content and the bulk polymer composition (as determined by NMR spectroncopy) for rubbery polymers of examples 1–4 are listed in Table 1. Note that each polymer is primarily of syndiotactic composition. The results for comparative example #5 are also listed in Table 1. Note that the polymer is primarily isotactic.

The pertinent properties for the polymers are shown in Table 2. Note that the tensile set values indicate that the primarily syndiotactic polymers of examples 1, 3 and 4 are highly elastic (Test, after stretching to 300% length, of only 22–28%) whereas the primarily isotactic control case of example 5 is not very elastic (Test of 120%).

TABLE 1

Productivity and composition of the bulk polypropylene from various phthalate based catalysts.

| Ex. | Catalyst No. | Xylene Sol. (% wt) | Productivity (Kg PP/g cat hr) | Syndiotactic (mol %) | Lsyn (ave) | Isotactic (mol %) | Liso (ave) | Defective (mol %) |
|---|---|---|---|---|---|---|---|---|
| 1 | A | 79.0 | 8.5 | 51 | 7 | 24 | 9 | 26 |
| 2 | B | 63.8 | 4.8 | 52 | 7 | 22 | 8 | 26 |
| 3 | C | 80.8 | 7.1 | 49 | 6 | 25 | 9 | 26 |
| 4 | D | 56.6 | 8.4 | 49 | 7 | 26 | 10 | 25 |
| 5 | * | 41.7 | 3.5 | 20 | 7 | 64 | 19 | 16 |

*control, no SCA was used

TABLE 2

Properties of the polymers from the various catalysts examined.

| Ex. | Catalyst No. | Melt Flow (dg/min) | Tensile Set (20%) | Tensile Yield (psi) | Tensile Break (psi) | Elongation at Break (%) |
|---|---|---|---|---|---|---|
| 1 | A | 2.08 | 28% | 500 | 883 | >917 |
| 3 | C | 1.67 | 22% | 441 | 836 | >1000 |
| 4 | D | 2.06 | 24% | 499 | 875 | >1000 |
| 5 | * | 0.39 | 120% | 1764 | 2837 | 770 |

*control

EXAMPLES 6–11

(SCA's producing primarily syndiotactic polymer)

The only cocatalyst used was triethylaluminum as a 0.28 molar solution in isooctane. 0.20 millimales of the selectivity control agent, 0.01 mmol of the procatalyst and 0.7 mmol of the cocatalyst were mixed together and after 20 minutes were injected into 2700 milliliters of liquid propylene in a reactor where the polymerizations were carried out for 90 minutes at 60° C. Procatalyst A was used throughout.

$^{13}C$ Magnetic resonance

Spectra were obtained at 135° C. on samples dissolved in 1,2,4-trichlorobenzene. The spectrum reference was the mmmm methyl group assigned at 21.68 ppm. FIG. 1 shows a typical $^{13}C$ NMR spectrum of polymer according to the present invention together with the spectrum of isotactic polypropylene prepared via the same procatalyst but using a dialkoxydiarylsilane as SCA. The syndiotactic penteds (rrrr) were clearly the dominant feature of the former spectrum. The calculated results of % syndiotactic, % isotactic, % defective and the respective average block lengths, for the boiling isooctane fractionated polymer are shown in Tables 3 and 4.

Pentad Analysis

The pented analyses for the examples were carried out utilizing the following formulae:

$$\% \text{Iso} = \frac{\text{mmmm} + 1.5 \text{ mmmr}}{\text{Total resonances}} \times 100 \quad \text{(I)}$$

$$L_{iso} = 3 + 2 \text{ (mmmm/mmmr)} \quad \text{(II)}$$

$$\% \text{Syn} = \frac{\text{rrrr} + 1.5 \text{ rrrm}}{\text{Total resonances}} \times 100 \quad \text{(III)}$$

$$L_{syn} = 3 + 2 \text{ (rrrr/rrrm)} \quad \text{(IV)}$$

% Defects is calculated by difference from 100% lent to the reversible elastic elongation described by G. Natta and G. Crespi in U.S. Pat. No. 3,175,999.

The analytical results of these experiments are shown in Table 3 set forth below. The table gives the percentage of isotactic and syndiotactic content as determined by $^{13}$C NMR analysis as well as the xylene soluble percentage in the polymer produced. Since each of these polymers contains significant amounts of both isotactic and syndiotactic blocks, I have included the average isotactic block length ($L_{iso}$), the average syndiotactic block length ($L_{syn}$) and an average crystalline block length ($L_{ave}$) which is the weighted average of the other two. In each case, the polymer contains a larger percentage of syndiotactic material than isotactic material and the residual stretch values (a measure of elasticity) are greater than 50% and the xylene solubles contents are greater than 60%.

TABLE 3
(Hindered heterocycles)

| Example | SCA | % Syn | Lsyn | % Iso | Liso | Lave | X.S. | Stretch |
|---|---|---|---|---|---|---|---|---|
| 6 | 2,6-Lutidine | 54.5 | 8.7 | 25 | 10 | 9.1 | 67.6 | 68% |
| 7 | Quinaldine | 52 | 8.9 | 27 | 12 | 10.0 | 62.4 | 110% |
| 8 | 2,3,5,6-Tetramethylpyrazine | 50 | 7.7 | 25 | 9 | 8.1 | 79.1 | 80% |
| 9 | 2,4,6-Collidine | 49 | 8.8 | 30 | 10 | 9.3 | 69.1 | 113% |
| 10 | 2,3-dimethylquinoxaline | 45 | 8.0 | 34 | 13 | 10.2 | 61.4 | 58% |
| 11 | 2,4-dimethylquinoline | 42 | 8.4 | 37 | 13 | 10.6 | 61.3 | 78% |

Tensile Properties

In order to prepare samples for tensile measurements, about 60 g of the polymer was blended in a Brabender mixer at 190° C. with 0.3 g of Irganox 1010 antioxidant. After cooling, a 6"×6"×2mm plate was compression molded at 204° C. under 5 tons pressure. Tensile bars were then cut from the plate using a 'C' or "D" die. The measurement conditions are as described in ASTM D 412-83. Roughly: Tensile set is the residual elongation imparted to a sample after stretching to 300% of its original length at a rate of 20 inches/minute and then allowing it to recover to zero load at that same rate.

Comparative examples 12-18 show the results of identical catalyst preparations and polymerizations which were performed with heterocyclic aromatic nitrogen compounds which were not effectively hindered within the meaning of this invention. In other words, aromatic nitrogen compounds in which there is no, substitution adjacent to the nitrogen atom in the ring or in which the substituent group was either not bulky enough, such as benzo groups, or in which the substituent group is too bulky, such as tertiary butyl. Table 4 gives the results of the polymerizations which were performed under the same conditions as specified in example 6-11.

TABLE 4
(Less Hindered Heterocycles)

| Example | Compare to | SCA | % Syn | Lsyn | % iso | Liso | Lave | X.S. (%) | Stretch |
|---|---|---|---|---|---|---|---|---|---|
| 12 | All | None | 22 | 6.7 | 60 | 14 | 12.0 | 42.4 | 20% |
| 13 | 6,9 | 2-picoline | 19 | 6.3 | 62 | 14 | 12.2 | 49.4 | 9% |
| 14 | 7,11 | quinoline | 21 | 6.7 | 61 | 15 | 12.9 | 44.4 | 14% |
| 15 | 8 | 2,3,5-trimethyl-pyrazine | 12 | 6.9 | 77 | 25 | 22.6 | 23.1 | 10% |
| 16 | 10,8 | phenazine | 21 | 7.0 | 62.5 | 17 | 14.5 | 36.4 | 14% |
| 17 | 11,6 | acridine | 18 | 6.8 | 64 | 17 | 14.8 | 31.0 | 21% |
| 18 | 6,9,13 | di-tertbutyl-pyridine | 28 | 7.5 | 56 | 15 | 12.5 | 44.7 | 30% |

Tensile yield is the stress required to induce a permanent deformation in the sample. Tensile at break is the stress required to break the sample at an elongation rate of 20 inches/minute. Elongation at break is the measured elongation at the break condition.

Melt flow index was determined under condition L (2160 g, 230° C.) on a Tinius Olsen Plastometer. The strands, which were formed by extrusion through the 3mm die of the melt flow device, were stretched to an equilibrated length by hand pulling to nearly the break point several times. The elasticity of the polymer is reported as the percentage elongation obtained upon applying a force nearly enough to break the strand (after which, of course, the strand returns to its equilibrated length). This measurement is essentially equiva- Example 13 shows that by removing a methyl group from the position adjacent the nitrogen and replacing it with a hydrogen atom, one greatly increases the percent of isotactic material versus the results of examples 6 and 9. The same thing is true of example 14 when compared to examples 7 and 11 and also example 15 when compared to example 8. In example 16, a methyl group was removed and replaced by a benzo group and the percent isotactic greatly increased over examples 8 and 10. The same is true of example 17 as compared to examples 6 and 11. In example 18, a methyl group was replaced by a bulky tertiary butyl group and the amount of isotactic material greatly increased as compared to examples 6, 9 and 13.

It can be seen in each case that the xylene solubles content of the polymer produced in Comparative Examples 12-18 is much lower than the xylene solubles content of the polymers produced according to examples 6-11 and also that in each case the isotactic content of the polymer produced is much higher than the syndiotactic content. Also, the average block lengths are longer in the polymers produced herein than those produced in Examples 6-11. The residual stretch numbers are all below 35% indicating that these polymers are relatively stiff and are really characterized as being only mildly elastomeric. Some of them were sticky to the touch.

Table 5 shows the tensile properties for some of the polymers produced with the above heterocyclic aromatic nitrogen compounds both effectively and noneffectively hindered. It can be seen that the significantly lower tensile set values (Test) distinguish the polymers produced via mediation of the above described effectively hindered nitrogen heterocycles as definitely more elastomeric in nature than the polymers of the comparative examples.

TABLE 5

Tensile Properties

| Ex. | | Tset* | Tyield (psi) | Tbreak (psi) | Elong @ break (%) |
|---|---|---|---|---|---|
| 6 | Syndio | 65% | 730 | 1554 | 750 |
| 7 | Syndio | 73% | 822 | 1845 | 769 |
| 8 | Syndio | 52% | 587 | 1114 | 908 |
| 9 | Syndio | 110% | 980 | 1651 | 764 |
| 13 | Compar | 171% | 1289 | 2402 | 843 |
| 17 | Compar | 204% | 1529 | 2893 | 785 |

*Stretch to 400% of original length.

EXAMPLE 19

This example describes the preparation and analysis of the two polymers for which the NMR analyses in FIG. 1 were made. Polymer A was made according to the same preparation as Example 1 except the polymerization was carried out for one hour at 60° C. Polymer B was made according to the same procedure as Polymer A except that the selectivity control agent was diphenyldimethoxysilane instead of tetramethylpyrazine.

I claim:

1. A process for the production of elastomeric, primarily syndiotactic polypropylene characterized by short average block lengths which comprises polymerizing propylene in the presence of a catalyst which comprises:
   (a) The reaction product of a magnesium compound of the formula $MgR_1R_2$, where $R_1$ is an alkoxide or aryl oxide group and $R_2$ is an alkoxide or aryloxide or halogen or of the formula X where X is a counterion or ions having a total charge of $-2$ and $R_3$ and $R_4$, which may be the same or different, are selected from alkyl groups of 1 to 4 carbon atoms and a tetravalent titanium halide wherein the reaction takes place in the presence of an electron donor,
   (b) An organoaluminum compound, and
   (c) A selectivity control agent which is selected from the group consisting of 2,3-dimethylquionoxaline, quinaldine, 2,6-lutidine, 2,4,6-collidine, tetramethylpyrazine and 2,4-dimethylquinoline.

2. The process of claim 1 wherein the tetravalent titanium halide is titanium tetrachloride.

3. The process of claim 2 wherein both $R_1$ and $R_2$ are ethoxide.

4. The process of claim 2 wherein the magnesium compound is of the formula X where X is a counterion or ions having a total charge of $-2$ and $R_3$ and $R_4$, which may be the same or different, are selected from alkyl groups of 1 to 4 carbon atoms.

5. The process of claim 4 wherein $R_3$ and $R_4$ are methyl groups and X is resorcinol or a substituted resorcinol monoanion.

* * * * *